United States Patent [19]
Crawford et al.

[11] Patent Number: 5,948,099
[45] Date of Patent: Sep. 7, 1999

[54] APPARATUS AND METHOD FOR SWAPPING THE BYTE ORDER OF A DATA ITEM TO EFFECTUATE MEMORY FORMAT CONVERSION

[75] Inventors: John H. Crawford; Mustafiz R. Choudhury, both of Santa Clara, Calif.

[73] Assignee: Intel Corporation, Santa Clara, Calif.

[21] Appl. No.: 07/744,818

[22] Filed: Aug. 12, 1991

Related U.S. Application Data

[63] Continuation of application No. 07/331,640, Mar. 30, 1989, abandoned.

[51] Int. Cl.[6] .................................................. G06F 9/315
[52] U.S. Cl. ........................ 712/225; 711/201; 708/209
[58] Field of Search .................................. 395/375, 500, 395/380, 566; 364/715.08; 711/201

[56] References Cited

U.S. PATENT DOCUMENTS

| | | | |
|---|---|---|---|
| 4,373,180 | 2/1983 | Linde ........................................ | 395/586 |
| 4,437,166 | 3/1984 | O'Brien .............................. | 364/715.08 |
| 4,509,144 | 4/1985 | Palmer et al. ...................... | 364/715.08 |
| 4,556,978 | 12/1985 | Kregness et al. ....................... | 371/49.1 |
| 4,653,019 | 3/1987 | Hodge et al. ....................... | 364/715.08 |
| 4,771,396 | 9/1988 | South et al. ........................ | 364/724.16 |
| 4,814,976 | 3/1989 | Hansen et al. ............................ | 711/201 |
| 4,918,624 | 4/1990 | Moore et al. ............................. | 395/114 |
| 4,931,925 | 6/1990 | Utsumi et al. ...................... | 364/715.08 |
| 4,939,684 | 7/1990 | Gehrig et al. .................... | 364/724.013 |
| 4,959,779 | 9/1990 | Weber et al. ............................. | 711/201 |
| 4,984,189 | 1/1991 | Neki .................................. | 364/715.08 |
| 5,029,069 | 7/1991 | Sakamura .................................. | 395/581 |
| 5,107,415 | 4/1992 | Sato et al. ................................ | 395/898 |
| 5,132,898 | 7/1992 | Sakamura et al. ....................... | 395/310 |

FOREIGN PATENT DOCUMENTS

| | | |
|---|---|---|
| 0304615 | 7/1988 | European Pat. Off. . |
| 1029880 | 1/1967 | United Kingdom . |

OTHER PUBLICATIONS

Weste et al., *Principles of CMOS VLSI Design*, Addison–Wesley Publishing Co., pp. 366–368, Oct. 1985.

"Architecture of the TRON VLSI CPU", Ken Sakamura, University of Tokyo, Apr. 1987.

"TRON Project, 1987", Proceedings of the Third TRON Project Symposium, Nov. 13, 1987.

Hubert Kirrmann, "Data Format and Bus Compatibility in Multi–processors," *IEEE Micro*, Aug. 1983, pp. 32–47.

Ken Sakamura (Ed.), *TRON Project 1987: Open–Architecture Computer Systems*, Proceedings of the Third TRON Project Symposium, Springer–Verlag, New York, 1987.

Hwang et al., *Computer Architecture and Parallel Processing*, 1984, pp. 328–354.

*Primary Examiner*—William M. Treat
*Attorney, Agent, or Firm*—Blakely, Sokoloff, Taylor & Zafman LLP

[57] ABSTRACT

A microprocessor instruction for performing an in-place byte swap on 32-bit data type to convert data stored in a big-endian memory format to a little-endian memory format, or visa-versa, is described. The invention comprises a modified barrel shifter which includes a plurality of multiplexers for selectively coupling data from one or more input buses to an output bus. The coupling of the individual bit lines of the data buses is arranged such that the lower order bits of the 32-bit quantity are exchanged with the higher order bits and visa-versa. Control lines connected to each of the multiplexers provide a means for controlling the byte swapping operation.

47 Claims, 14 Drawing Sheets

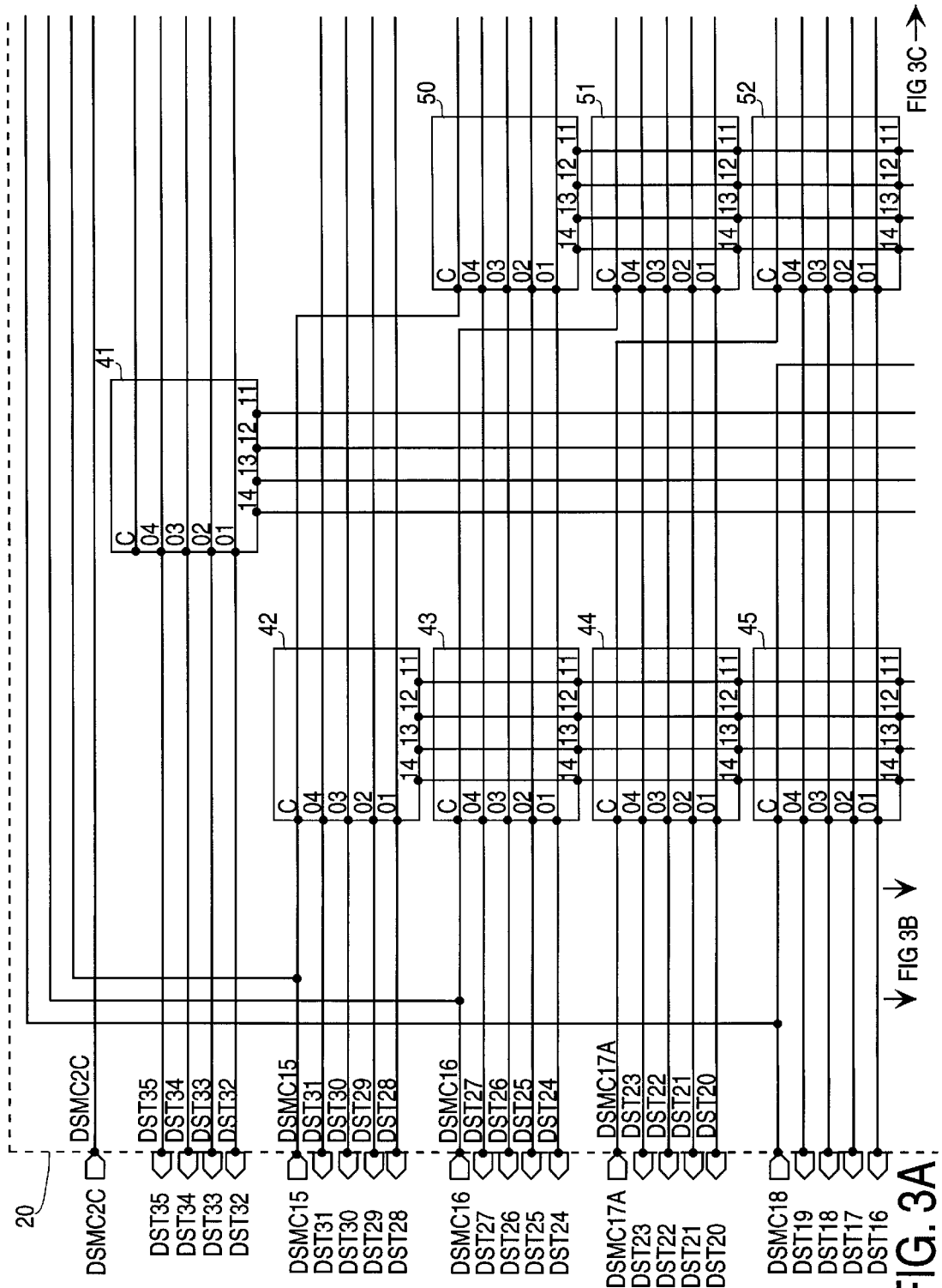

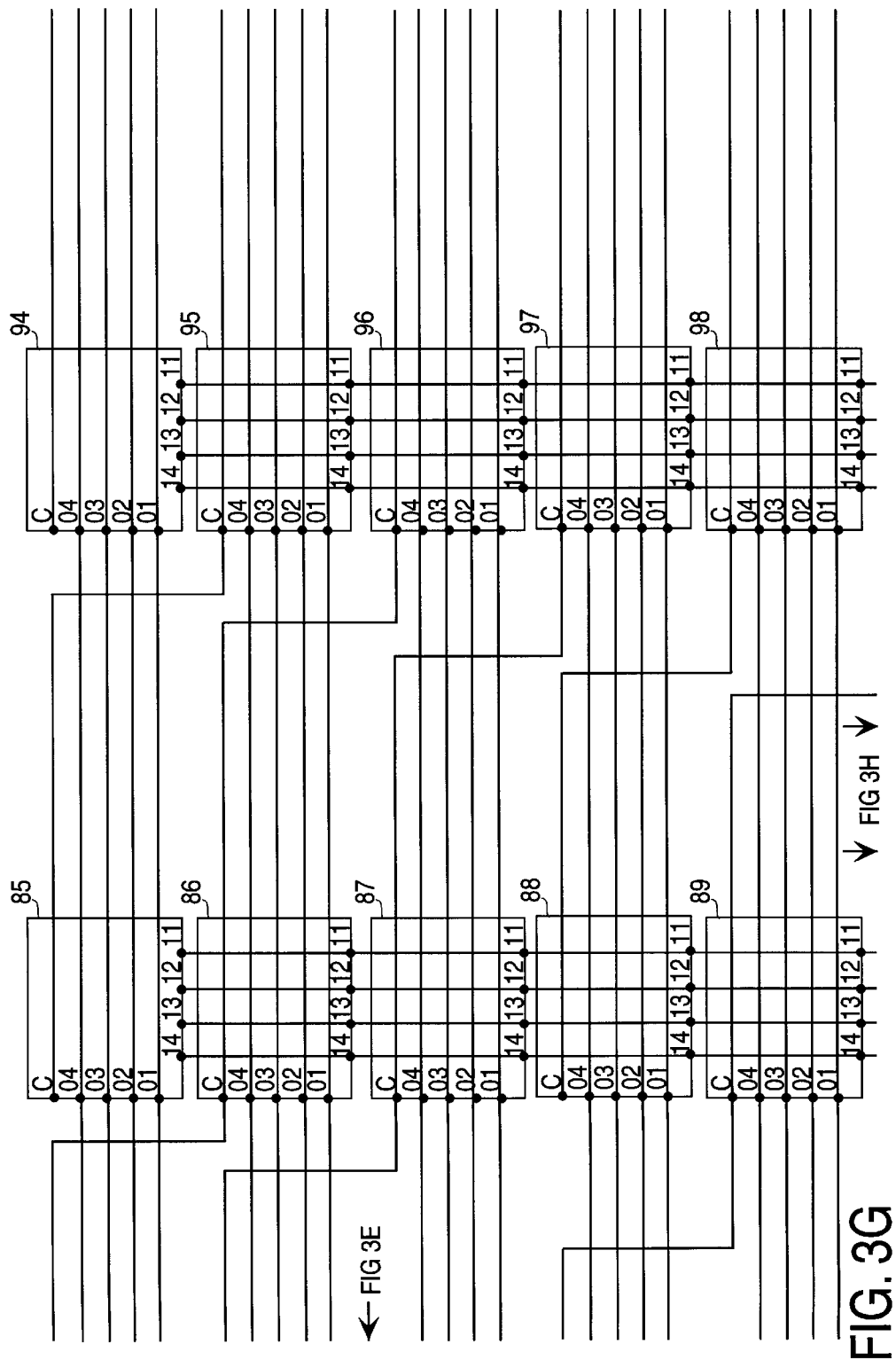

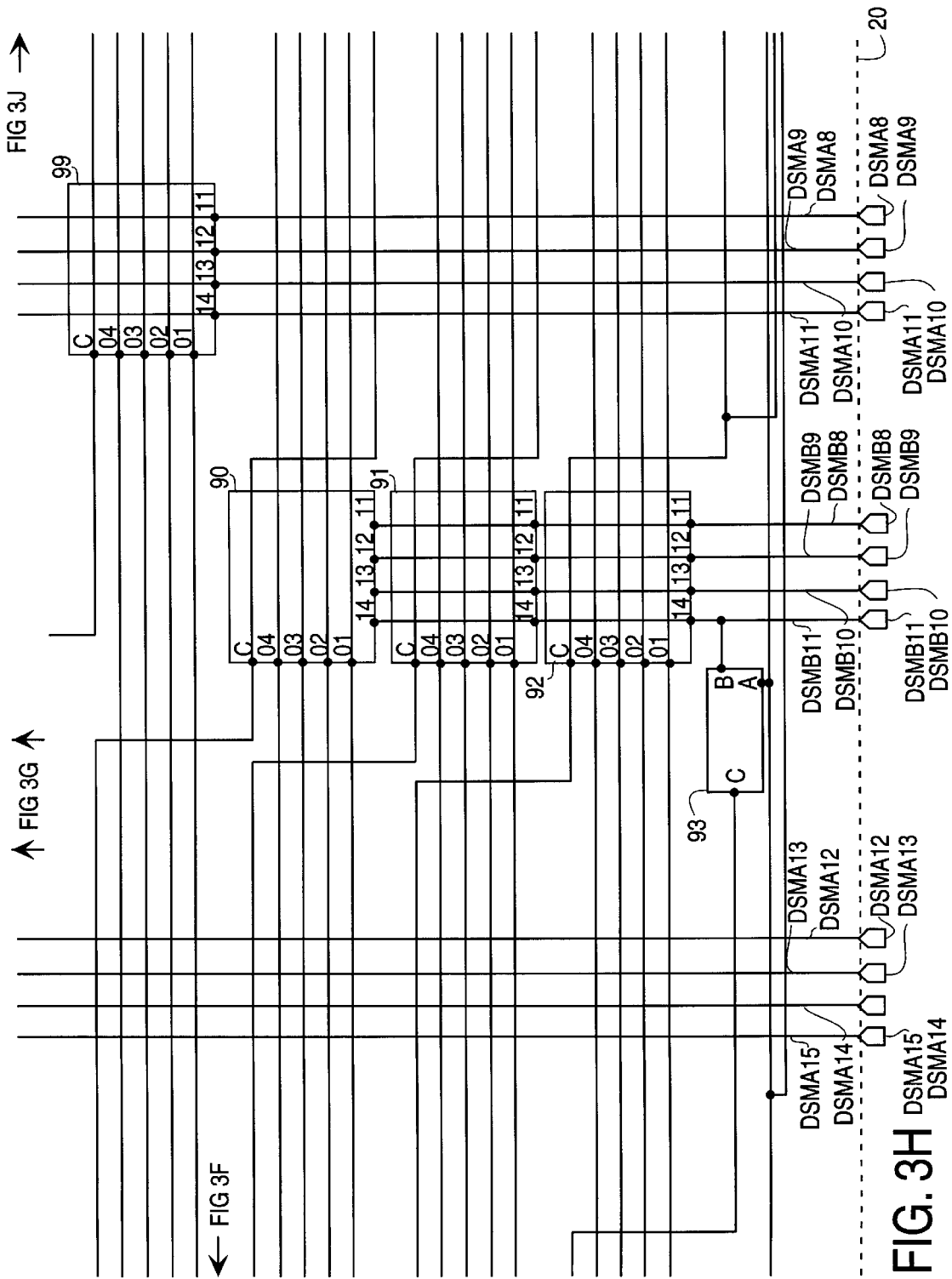

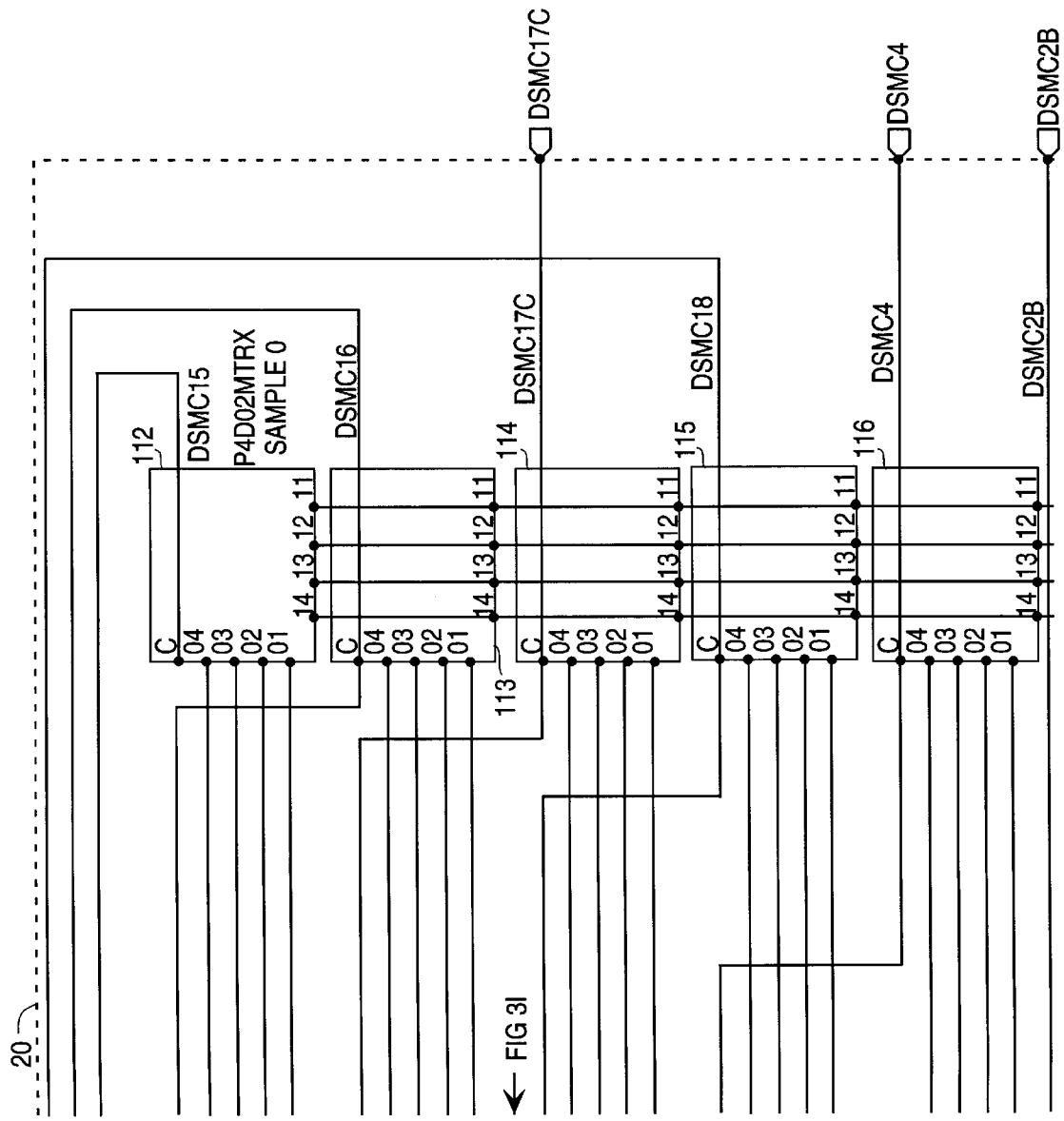

APPARATUS AND METHOD FOR SWAPPING THE BYTE ORDER OF A DATA ITEM TO EFFECTUATE MEMORY FORMAT CONVERSION

This is a continuation of application Ser. No. 331,640, filed Mar. 30, 1989 now abandoned.

FIELD OF THE INVENTION

The present invention relates to the field of semiconductor microprocessors.

BACKGROUND OF THE INVENTION

The present invention covers a byte swapping instruction which may be implemented within the architecture of a microprocessor. The microprocessor utilized with the present invention is the Intel 80486™ Microprocessor, frequently referred to as the 486™ Processor. The 486 processor is an improved version of the Intel 80386™ microprocessor, also known as the 386™ processor. (Intel, 80386, 386, 80486 and 486 are trademarks of Intel Corporation).

Generally, information is stored in the memory of a microprocessor system in data structures which typically vary anywhere between 8 to 64-bits in length. In the 486 microprocessor a "word" is defined to be 16-bits wide, while a doubleword, or "dword", is 32-bits wide. Words are stored in two consecutive 8-bit bytes in memory with the low-order byte at the lowest address and the higher-order byte at the higher address. Dwords are stored in four consecutive bytes in memory with the low-order byte at the lowest address and the high-order byte at a highest address. The address of a word or dword data item within the microprocessor is the byte address of the lowest-order byte. This type of addressing, particularly with respect to a dword data item, is known as the "little-endian" method for storing data types that are larger than one byte. All of Intel's x86 family members use the little-endian method for storing data types.

The alternative method of storing data types within a memory of a microprocessor is referred to as the "big-endian" method. In the big-endian method, data is stored with the high-order bits at the lowest addressed byte.

Thus, the big-endian format is opposite to the little-endian counterpart. The distinction between the two is simply which byte of a multiple byte quantity is assigned the lowest address, and which byte is assigned the highest address. In big-endian format, as the name implies, the big bytes come first; that is, the high-order bits are at lower addresses. The big-endian memory format is used by IBM's 370 line of computers as well as the 68000 line of microprocessors manufactured by Motorola, Inc. In addition, many RISC processors use the big-endian format.

Very often a programmer desires to form a data base having mixed data memory formats. Other programmers frequently want to send data over a network from one computer which stores integer data in a big-endian format to another computer which stores integer data in a little-endian format. Therefore, at some point in time, a conversion needs to be performed to convert data stored in one memory format to the other.

In a 16-bit environment the conversion between memory formats is straightforward. A number of instructions are generally available within a microprocessor to simply rotate or exchange 8-bit registers. In other words, the 8-bit quantities that form the 16-bit data item can simply be swapped or exchanged.

Byte swaps of higher-order number of bits, say 32 or 64-bit quantities, are more problematic. For example, one way that a prior art microprocessor might perform this byte swap operation on a 32-bit item is to first execute a byte swap of the lower two bytes; then rotate by sixteen; then perform a second bye swap on the remaining two bytes. Hence, three separate instructions are required to perform a conversion—each instruction taking two clocks to implement for a total of six clocks for the entire conversion. Also, because each instruction is generally two to three bytes in length, a great deal of code needs to be generated—probably nine instruction bytes—for these three rotate instructions.

An alternative approach would be to have the memory format conversation take place in consecutive steps in microcode. However, using microcode would still take six clocks or more along with a large number of instruction bytes. Consequently, performing memory format conversions from big-endian to little-endian, or visa-versa, in prior art machines requires a substantial amount of internal memory space and a significant performance penalty.

A different approach that is used by certain RISC processors is referred to as "pin-strapping". Pin-strapping consists of nothing more than a static switch that is hard-wired into the printed circuit board housing the microprocessor. The pin-strap option forces the computer to treat memory in one fashion or another, i.e., either as big-endian or little-endian format. This hard-wired approach has the obvious drawback in that it is static and therefore incapable of being programmed or controlled dynamically by the microprocessor or user.

As will be seen, the present invention replaces these past approaches with a single byte swap instruction capable of converting a big-endian dword to a little-endian format. This instruction provides rapid conversion between the two formats without adding any extra hardware or performance cost. An approximately 10% speed increase is reported for programs that make heavy use of big-endian data when executing on a 486 processor (e.g., a little-endian machine).

SUMMARY OF THE INVENTION

A specialized microprocessor instruction optimized for performing an in-place byte swap on 32-bit data type is described. This byte swap operation is especially useful in converting data stored in a big-endian memory format to a little-endian memory format, or visa-versa. The invention comprises a modified barrel shifter which includes a plurality of multiplexers for selectively coupling data from one or more input buses to an output bus. The coupling of the individual bit lines of the data buses is arranged such that bits 0–7, 8–15, 16–23 and 24–31 of the input bus are coupled to corresponding bits 24–31, 16–23, 8–15 and 0–7, respectively. Control lines connected to each of the multiplexers provide a means for controlling the byte swapping operation.

The presently described byte swap instruction allows the programmer to convert data from a big-endian memory format to a little-endian data format, and back again, without incurring the performance penalties associated with past microprocessors. In addition, this one instruction requires only one execution clock cycle to perform the conversion whereas prior art microprocessors typically require three instructions and six clocks.

BRIEF DESCRIPTION OF THE DRAWINGS

The present invention will be understood more fully from the detailed description given below and from the accompanying drawings of the preferred embodiment of the invention which, however should not be taken to limit the invention to the specific embodiment but are for explanation and understanding only.

FIGS. 3A–3L collectively comprise a circuit schematic of the barrel shifter utilized in the currently preferred embodiment of the present invention.

DETAILED DESCRIPTION OF THE INVENTION

A microprocessor comprising a byte swap instruction for converting the memory data formats from one type to another is described. In the following description, numerous specific details are set forth, such as bit lengths, etc., in order to provide a thorough understanding of the present invention. It will be obvious however, to one skilled in the art that these specific details need not be used to practice the present invention. In other instances, well-known structures and circuits have not been shown in detail in order not to unnecessarily obscure the present invention.

Figure 1:
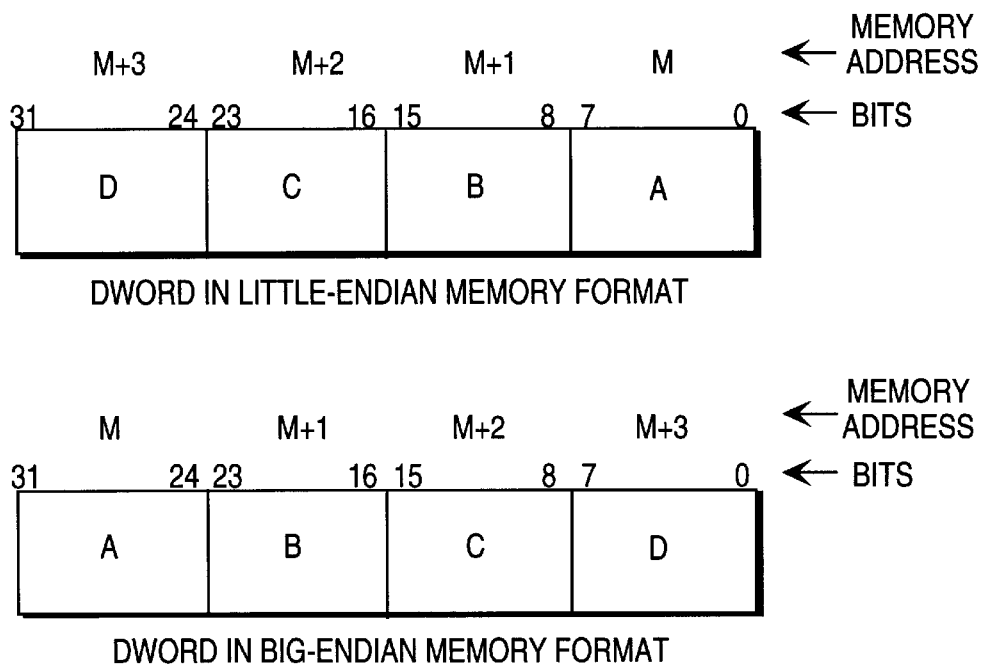
FIG. 1 is a comparison between little-endian and big-endian memory formats. Both memory formats are shown with their corresponding memory addresses and bit numbering. The highest order bit is shown as bit 31 while the lowest order bit is bit 0.

FIG. 1 illustrates the differences between the big-endian and little-endian memory formats for dwords having a length of 32-bits. In FIG. 1, for both the little-endian and big-endian memory formats, the 32-bits of data are shown with the low-order bit numbered bit 0, the high-order bit numbered bit 31, and the memory addresses numbered along the top.

As shown, each 32-bit dword is partitioned into four 8-bit bytes. These are denoted by capital letters A–D in FIG. 1. In the little-endian memory format, dwords are stored in four consecutive bytes in memory with the low-order byte being positioned at the lowest address and the high-order byte positioned at the highest address. This is illustrated in FIG. 1 where for a little-endian memory format, bits 0–7 are stored in memory address M, bits 8–15 are stored in memory address M+1, bits 16–22 are stored in memory address M+2, and bits 24–31 are stored in memory address M+3. The address of a dword data item in a little-endian format is the byte address of the lowest-order byte, (e.g., memory address "M").

In the big-endian memory data format, the bits are arranged in the opposite order. That is, bit-endian data is stored with the high-order bits at the lowest address byte, and the lowest-order bits at the highest memory address byte. Therefore, as shown in FIG. 1, in big-endian format bits 0–7 are stored at memory address M+3; bits 8–15 are stored at memory address M+2; bits 16–23 are stored at memory address M+1; and bits 24–31 are stored at memory address M. The address of a dword data item in big-endian memory format is the byte address of the highest-order byte.

To perform a conversion from big-endian memory format to little-endian, the following process needs to occur. First, the data item is moved from memory to an internal register. Next, byte A corresponding to bits 24–31 in the big-endian format need to be transferred or swapped with the contents of byte D corresponding to bits 0–7. Similarly, byte B needs to be swapped with byte C. This byte swapping operation is performed in the preferred embodiment using the barrel shifter located within the integer execution unit of the microprocessor. Finally, the swapped data item is latched into a temporary latch or register to be subsequently written back to the source destination register in memory.

Figure 2:
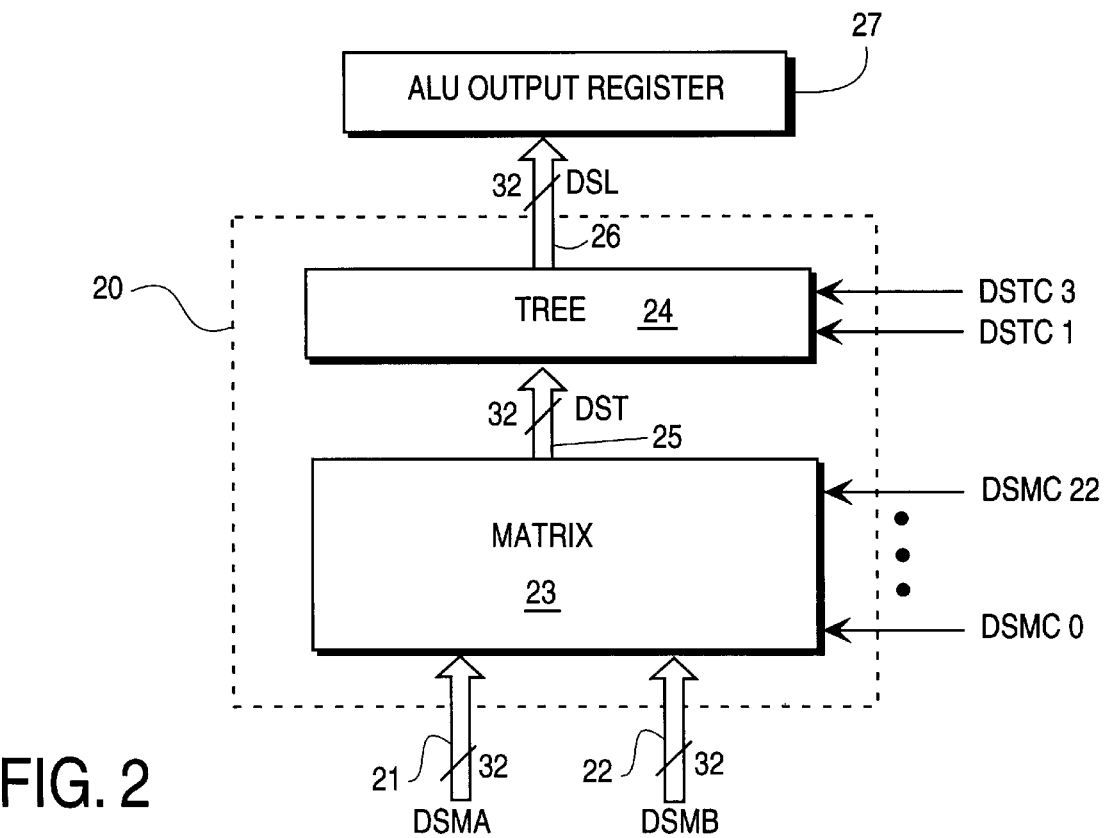
FIG. 2 is a block diagram illustrating the data flow through the barrel shifter of the invented microprocessor.
Figure 3B:
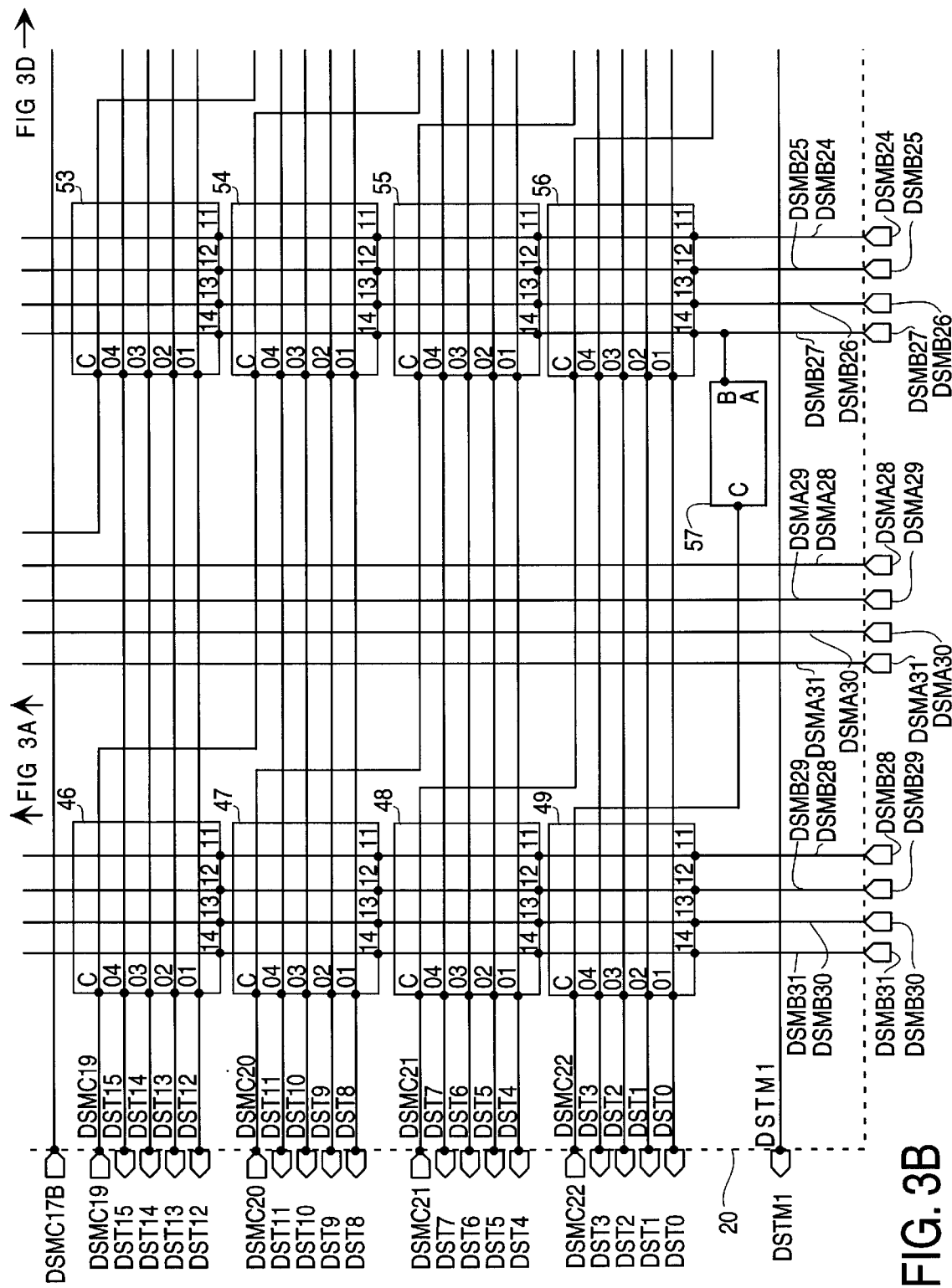
Figure 3C:
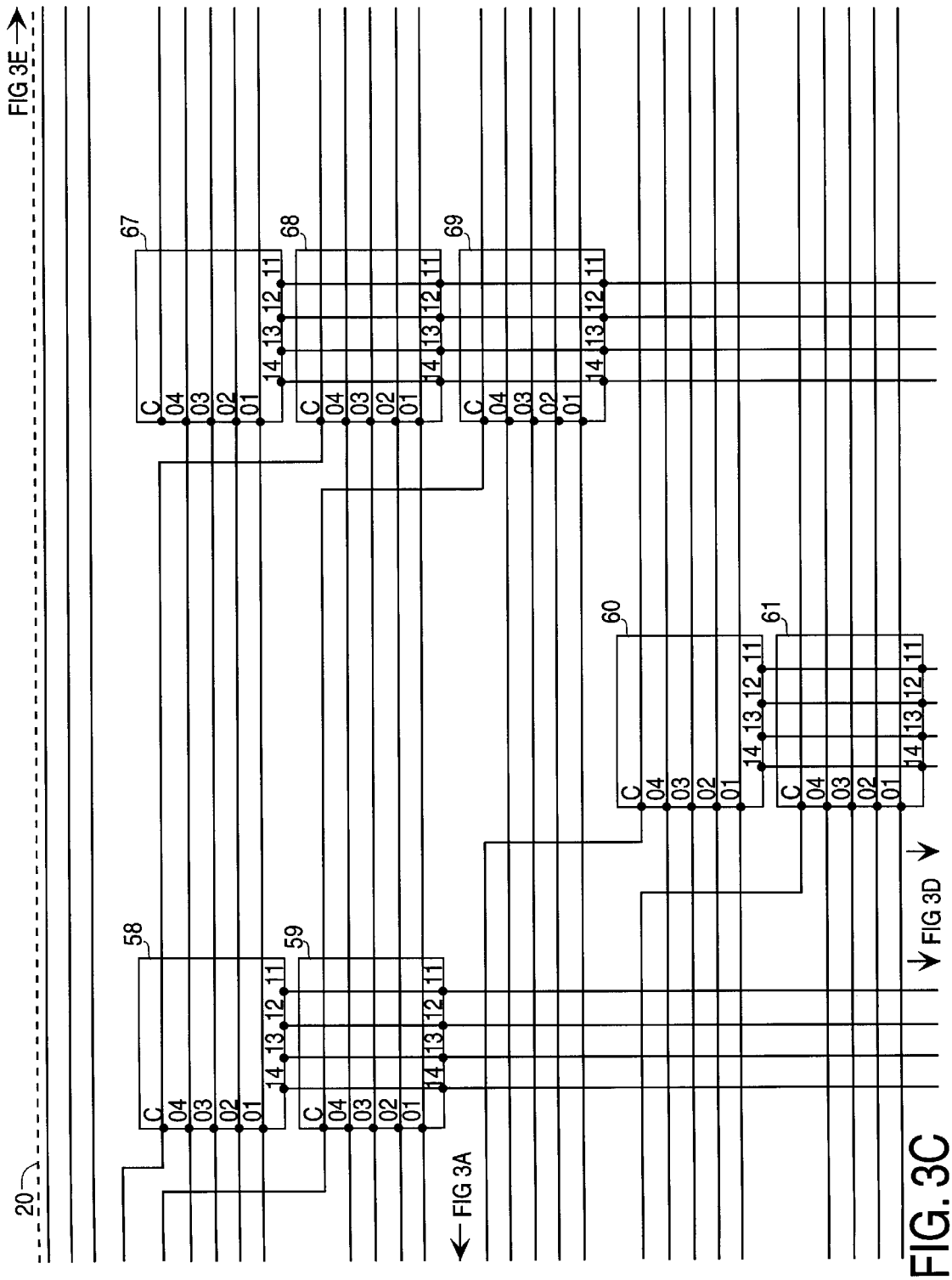
Figure 3D:
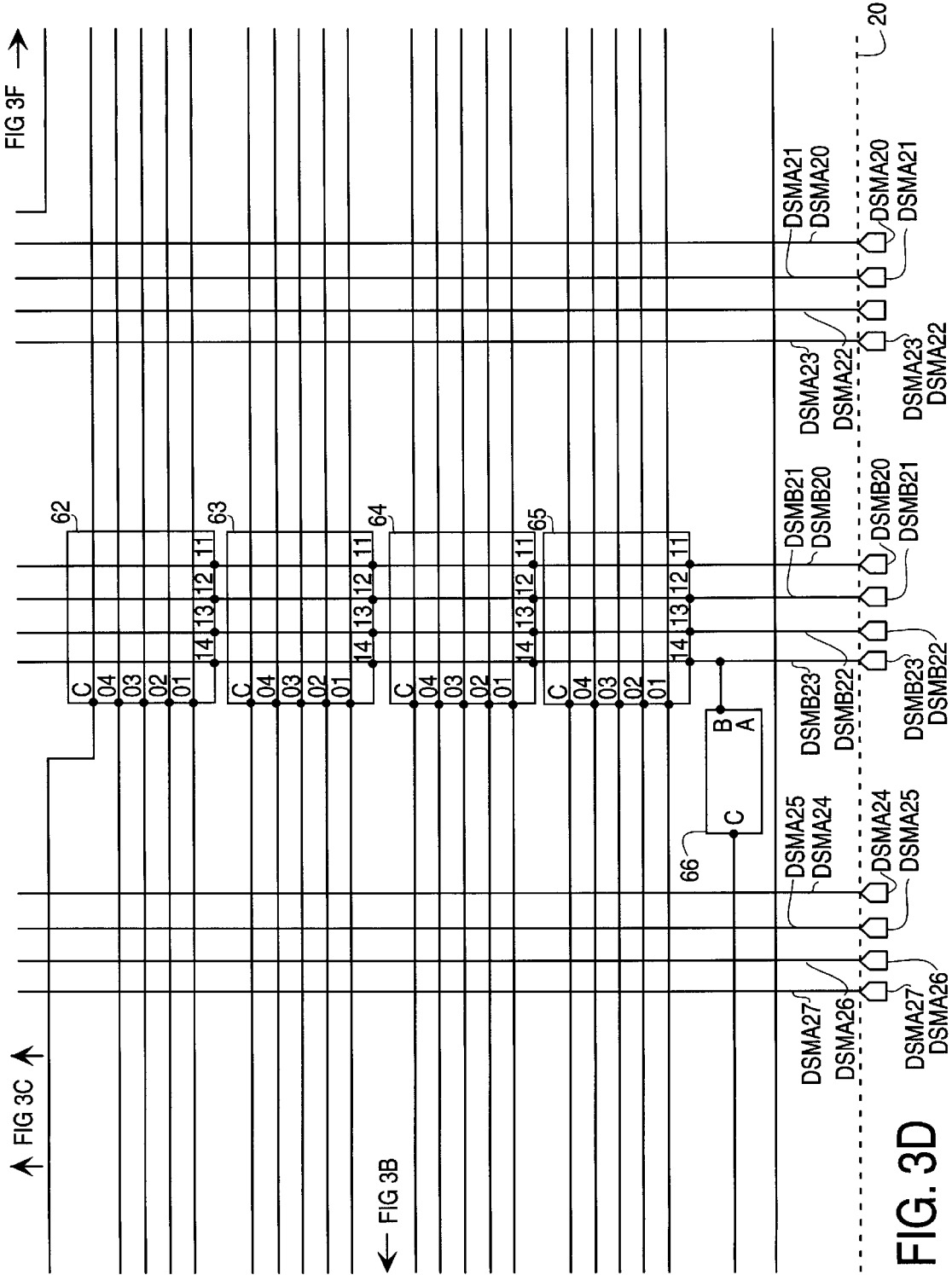
Figure 3E:
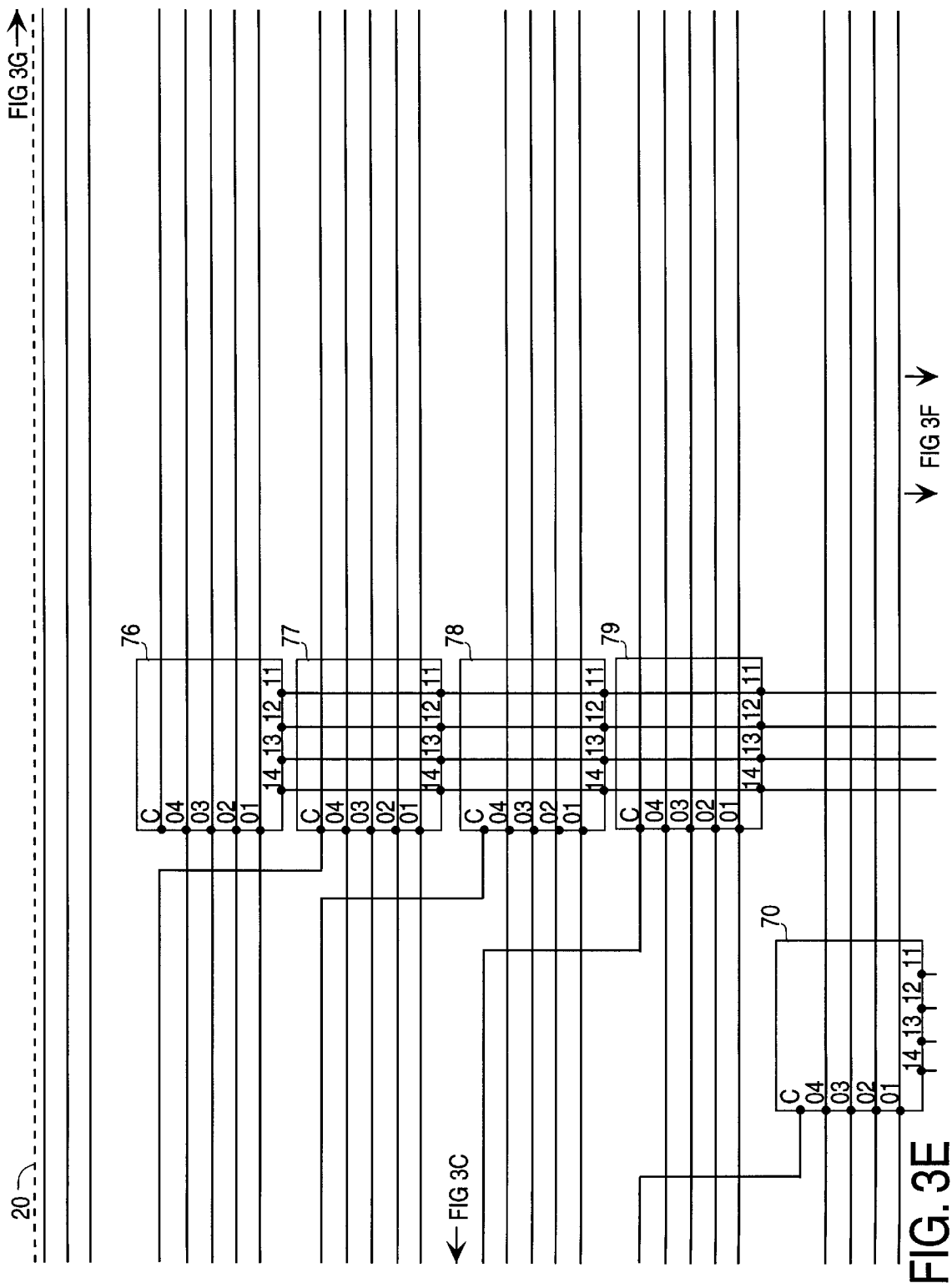
Figure 3F:
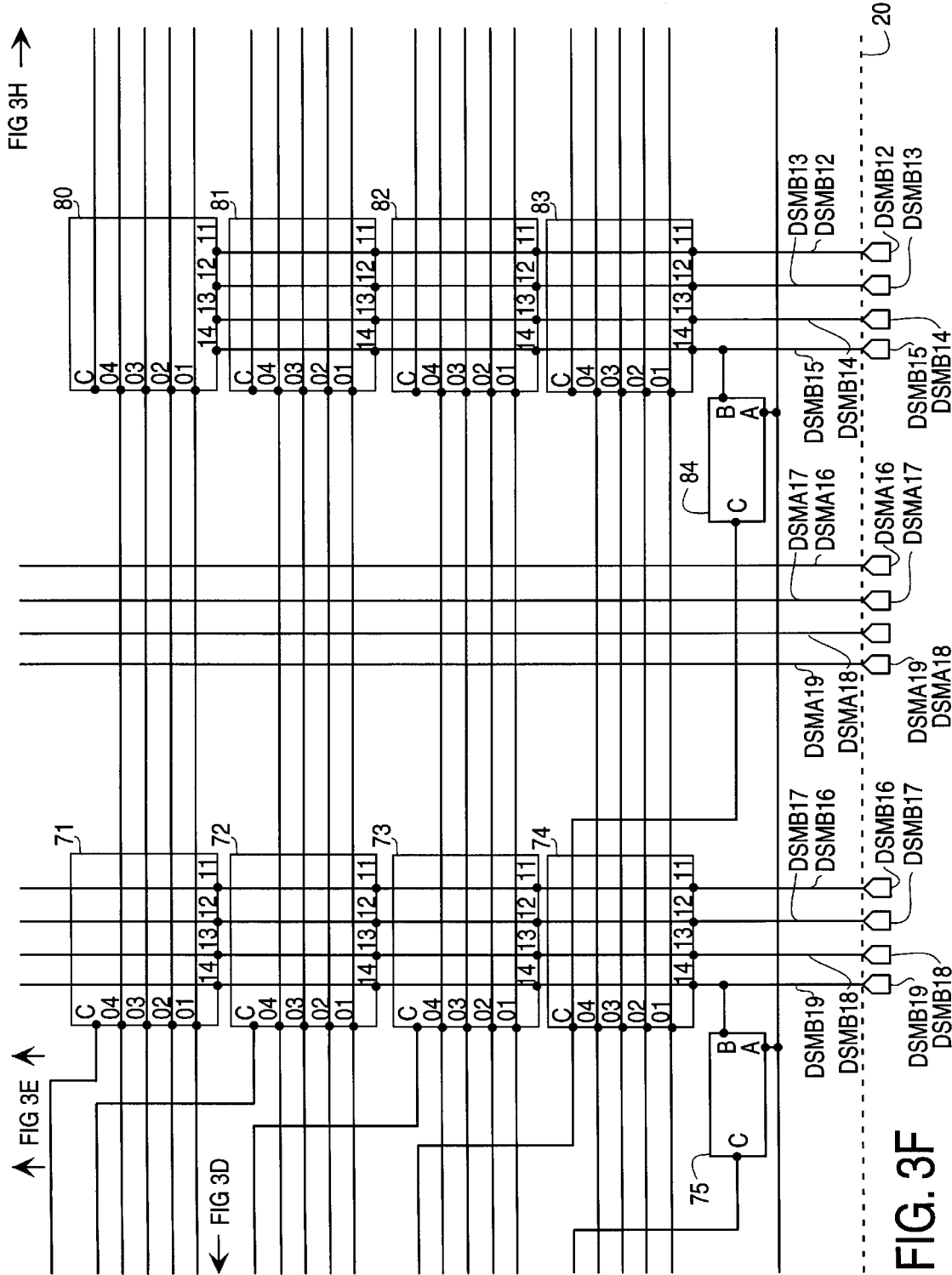
Figure 3I:
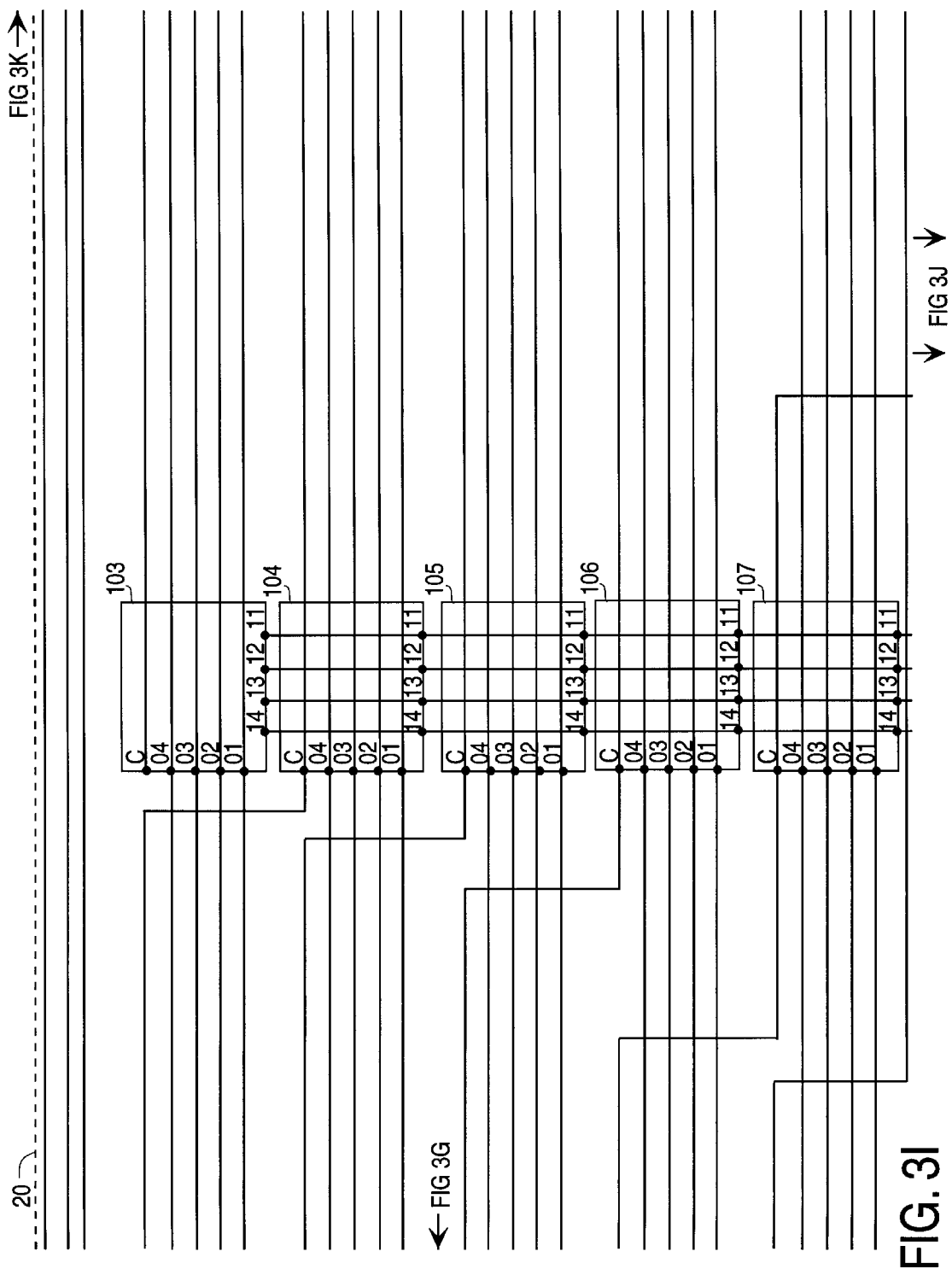
Figure 3J:
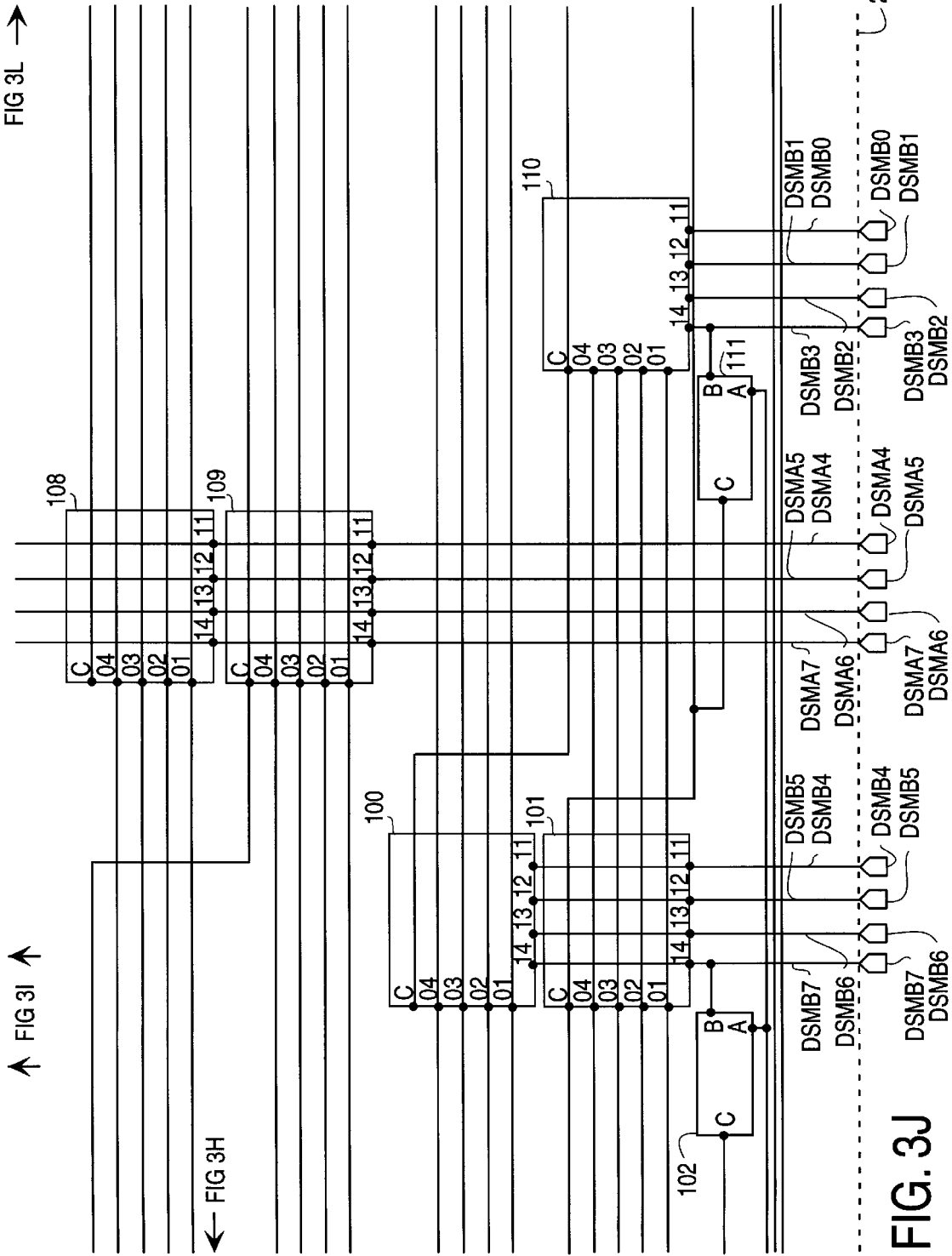
Figure 3L:
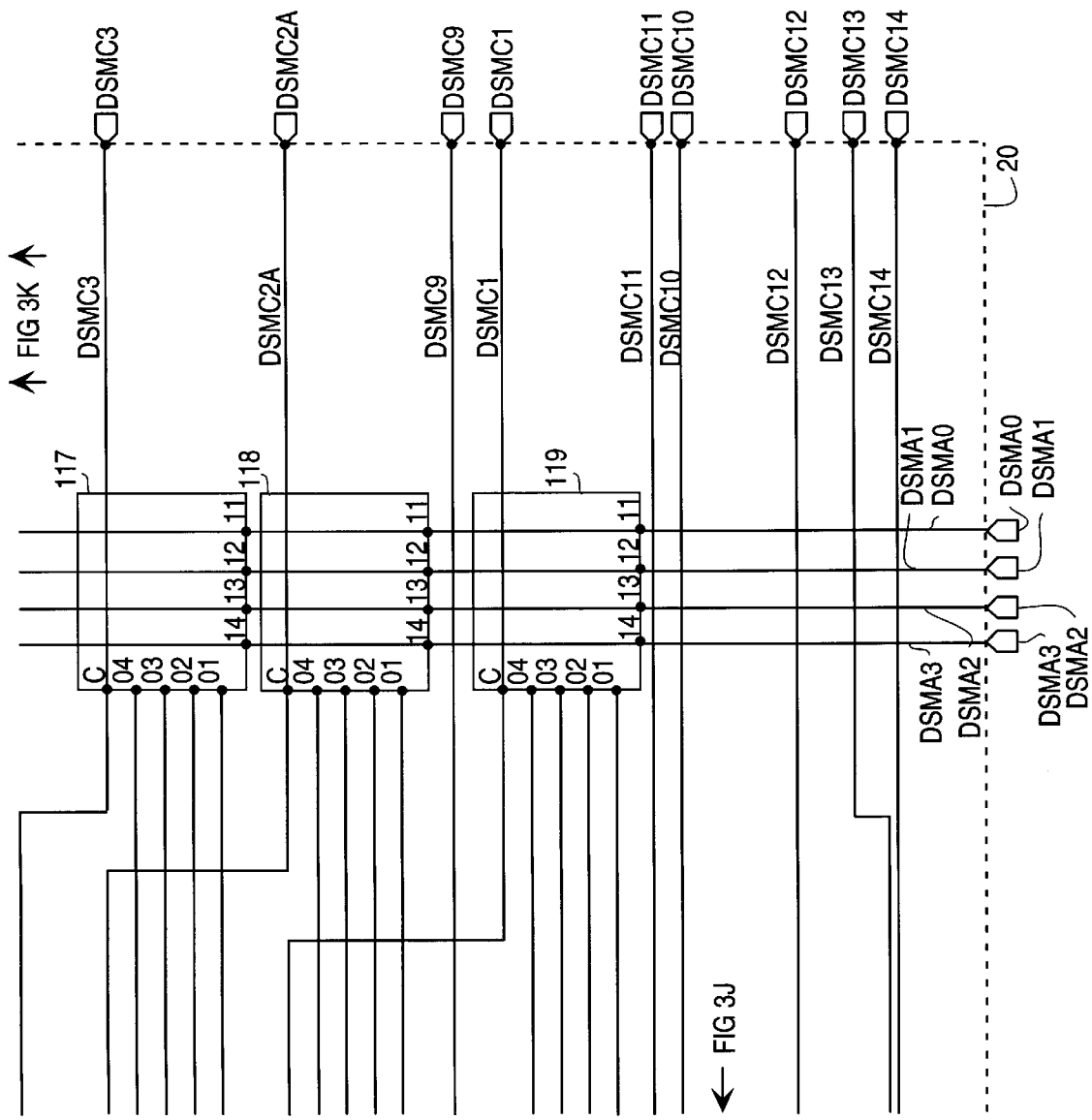

Referring now to FIG. 2, a block diagram of the data flow through the barrel shifter utilized to implement the byte swap instruction of the present invention is shown. The barrel shifter 20 is a device commonly known in the art, and is typical found in most microprocessors. Barrel shifter 20 can shift/rotate a word of data by N positions in a single operation—N ranging from 0 to the word size. Ordinarily, barrel shifter 20 is used for a variety of operations. For instance, barrel shifter 20 is used for shift instructions, rotate instructions, bit scans, etc.

In the invented microprocessor, barrel shifter 20 is comprised of two parts: a matrix element 23 and a tree 24. Matrix 23 receives data inputs along 32-bit buses 21 and 22, labelled dsma and dsmb, respectively. Generally, the data supplied along bus line 21 is identical to the data supplied on bus line 22. This facilitates rapid rotation or shifting of data as will be seen. Matrix 23 receives these data inputs and performs a shift operation on a nibble granular basis, (i.e., the data is shifted by a multiple of 4). In this way, the data is initially shifted in the first stage of the shift operation by multiples of 4 (e.g., 4, 8, 12, 16, etc.). Additional shifting by anything less than 4 (i.e., 0–3) is performed in tree 24. Matrix 23 is coupled to tree 24 along bus 25 labelled DST. Tree 24 then provides an output on 32-bit bus 26 labelled DSL to ALU output register 27.

Referring now to FIGs. 3A–3L, a detailed circuit schematic of the barrel shifter 20 utilized in the currently preferred embodiment of the present invention is illustrated. Barrel shifter 20 comprises a plurality of vertical data input lines coupled to dsma and dsmb bus lines 21 and 22, respectively. These data input lines are shown comprised of individual bit lines DSMA0-31 and DSMB0-31. Each line is coupled to the inputs of a plurality of 4×4 multiplexers. For example, dsmb31 is coupled to the 14 input of multiplexors 42–49.

Also included in FIGS. 3A–L are a plurality of horizontal data output lines. These horizontal data bit lines comprise DST bus 25 and are coupled to the outputs of a plurality of multiplexers. The individual bit lines of DST bus 25 are shown labelled DST0-31 and are connected to ALU output register 27 as discussed in connection with FIG. 2 (additional lines are shown, e.g., DST35, but these are not germane to the invention; therefore, they will not be discussed). For instance, DST31 is shown connected to multiplexers 42, 59, 68, 77, 86, 95,104 and 113. Control is provided to each of the multiplexers of barrel shifter 20 via control lines labelled DSMC0-22.

Each of the multiplexers 41–119 (excluding devices 57, 66, 75, 84, 93, 102 and 111 which are only used in conjunction with tree 24) comprise a multiplexer having four input pins (i.e., I1–I4), four output pins (i.e.,O1–O4), and a control pin (i.e.,C). During operation, when the control line of an individual multiplexer is asserted, the input data lines are electrically coupled to the output data lines. By way of example, when the control input line to multiplexer 110 is asserted the data present at input pin $I_1$ (e.g., DSMB0 is electrically coupled to output pin $O_1$, (e.g., DST0). In a similar manner, the data associated with pins $I_2$, $I_3$, and $I_4$ (e.g., DSMB1, DSMB2, and DSMB3, respectively) is electrically coupled to output pins $O_2$, $O_3$ and $O_4$, respectively (e.g., DST1, DST2, and DST3, respectively). Thus, each individual multiplexer within barrel shifter 20 operates as a switching element connecting groups of data inputs to corresponding output lines.

Figure 4:
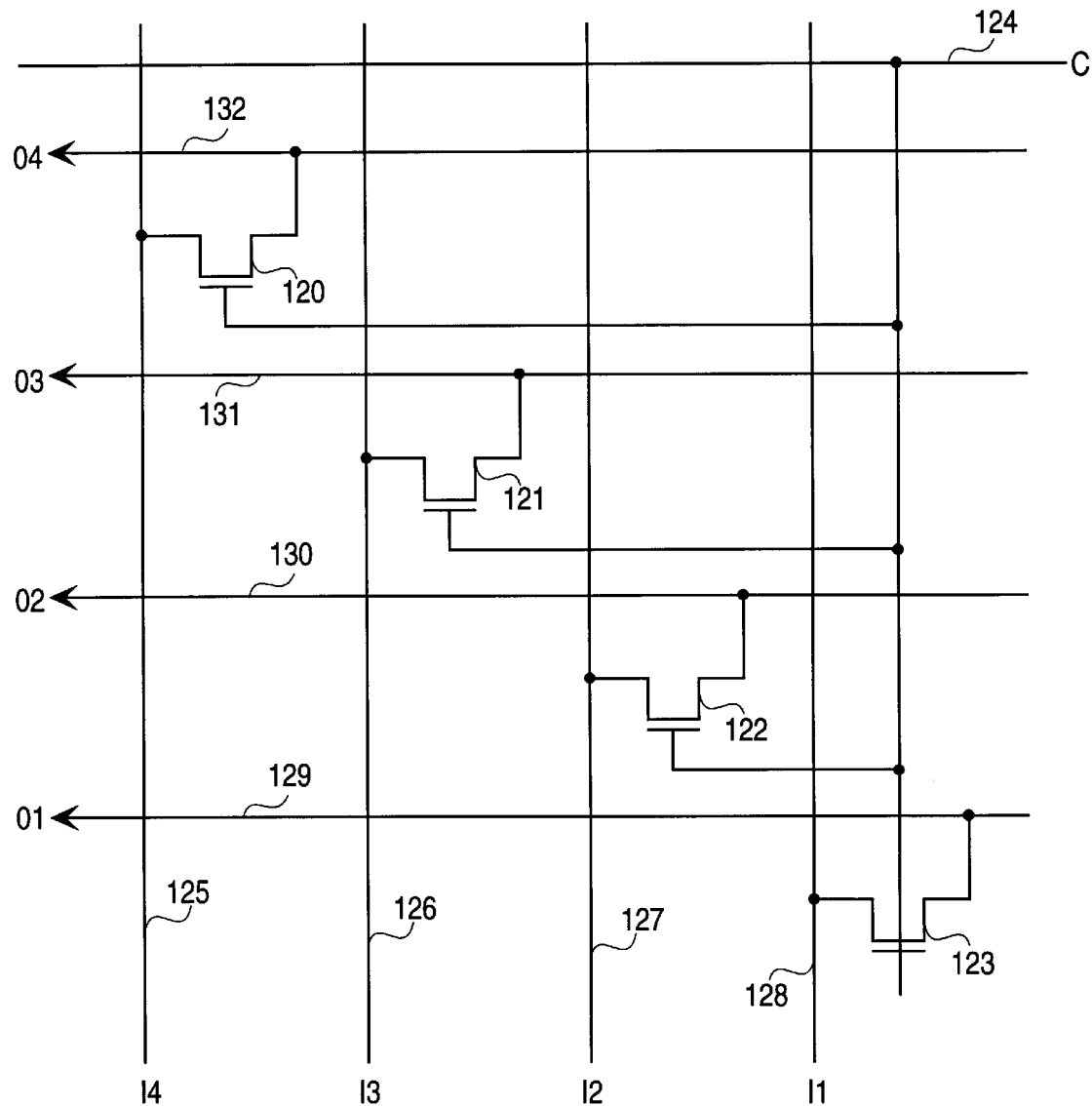
FIG. 4 shows the circuit schematic for the 4×4 multiplexer utilized within the barrel shifter of FIG. 3.

With reference now to FIG. 4, a circuit schematic of the 4×4 multiplexer used in the currently preferred embodiment of the present invention is shown. This multiplexer includes field-effect devices 120–123 which preferably comprise ordinary n-channel MOS devices. The gate of each of these field-effect transistors is coupled to control line 124. The drain and source regions of each transistor are coupled to a different pair of input and output lines. For instance, transistor 123 has its source connected to input line 128 labelled $I_1$ and its drain coupled to output line 129 labelled $O_1$. When control line 124 is asserted by taking it to a high positive potential, a conductive channel is formed between the source and drain regions of devices 120–123. This conductive channel provides electrical connection between the corresponding input and output pins. Thus, a high positive potential on control line 124 provides electrical connection between lines 128 and 129, 127 and 130, 126 and 131, and 125 and 132.

Barrel shifter 20 of the invented microprocessor is similar to barrel shifters found in prior art microprocessors such as the 80386 with the exception that certain control signals have been split to accommodate the format conversion of the present invention. The original matrix control signal DSMC2 of the 386 processor has been split into three control signals, DSMC2*a*, DSMC2*b* and DSMC2*c* in order to aid the one execution clock implementation of the byte swap (BSWAP) instruction. Also, the DSMC17 signal is shown split into three signals, DSMC17*a–c*. For ordinary operations (everything except a BSWAP) these control lines are merged into their original form and barrel shifter 20 operates normally. It is only during execution of the BSWAP instruction that the separate split lines become important.

In phase 1 of the execution clock cycle of the BSWAP instruction, four of the matrix control signals are asserted. All other control signals of the matrix are negated. The four matrix control signals which are asserted include dsmc21 (which muxes bits 24–31 of dsmb bus to bits 0–7 of the matrix output bus DST), dsmc17*b* (which muxes bits 16–23 of dsmb bus to bits 8–15 of matrix output bus DST), dsmc2*b* (muxing bits 8–15 of dsma bus to bits 16–23 of matrix output bus DST) and dsmc17*c* (muxing bits 0–7 of dsma bus onto bits 24–31 of matrix output bus DST). In phase 2 of the execution clock, the barrel shifter accepts the data inputs along the dsma and dsmb buses and swaps the bytes simply by providing appropriate electrical connection between the DSMA, DSMB buses and DST output lines. Therefore, the memory item data format is automatically converted from either big-endian to little-endian or from little-endian to big-endian. The converted data output by the matrix proceeds through the tree of the shifter without any additional shifts and is subsequently loaded into the ALU output latch 27.

In the currently preferred embodiment, the BSWAP instruction is comprised by two 8-bit instruction bytes. Thirteen of the bits of the instruction are defined as the opcode while the lower four bits of the second byte specify the register that is to participate in the operation.

One important aspect of the present invention is that the BSWAP instruction acts as its own inverse so that a separate instruction to convert back from a previously converted format is unnecessary. In other words, the data provided on data input buses 21 and 22, may be converted from big to little, or from little to big, using the same instruction.

Another operation where the BSWAP instruction proves useful is in load/store operations. Consider the case in which a user wishes to perform operations on a machine which stores all data in a little-endian format. If the user performs a normal load to a register followed by a BSWAP instruction, the big-endian format is translated into little-endian automatically, thereby enabling the processor to operate on it immediately (i.e., add, subtract, multiply, etc.). Following completion of all arithmetic operations, the programmer might execute another BSWAP followed by a normal store to memory to restore the data in its original format in memory. Achieving the identical sequence of operations on a prior art microprocessor such as the 80386 takes considerably more time and storage area.

Although the byte swap instruction of the present invention is currently defined for 32-bit dwords, it also provides a basic building block for higher-order memory format conversions (e.g., 64-bits and on). In executing a 64-bit swap, the machine first loads the 64-bit quantity into two registers. Next, it executes BSWAPs on each of the registers. Afterwards, the processor simply renames the registers in reverse order. In other words, the register containing the higher-order bits is renamed as the lower-order register, and visa-versa. This type of renaming scheme obviates the need to physically swap the registers. When utilized for conversions of 64-bits and higher, the performance cost savings are magnified.

Thus, a byte swap instruction in a microprocessor for converting between memory data formats has been described.

We claim:

1. Apparatus for swapping the byte order of a 32-bit data item stored in a register of microprocessor means, said apparatus operating in response to a single instruction executed by said microprocessor means, said apparatus comprising:

matrix coupling means for coupling said data item from said register on a plurality of input data lines to a corresponding plurality of output data lines, the coupling swapping the byte order of bits 0–7, 8–15, 16–23 and 24–31 of said data item to corresponding bit positions 24–31, 16–23, 8–15 and 0–7, respectively, of said output data lines; and control means responsive to said single instruction coupled to said matrix coupling means for controlling said swapping of said byte order of said data item.

2. The apparatus of claim 1, further comprising a register means coupled to said output data lines for storing said swapped data item.

3. The apparatus of claim 2, wherein said matrix coupling means comprises a barrel shifter which includes a plurality of multiplexers, each coupling at least one bit of said data item on said input data lines to said output data lines.

4. The apparatus of claim 2, wherein said single instruction comprises two instruction bytes.

5. The apparatus of claim 1, 2 3 or 4 wherein said swapping of said byte order is performed in one execution clock cycle of said microprocessor means.

6. In a computer system receiving a data item at an input and producing a shifted or rotated data item at an output, an apparatus for changing the format of a 32-bit data item from a first format to a second format, said apparatus comprising:

a matrix shifter means including a plurality of input lines for connection to said input, a plurality of output lines for connection to said output, and a plurality of multiplexers, said multiplexers electrically connecting ordered bits 0–7, 8–15, 16–23 and 24–31 defining said first format to corresponding ordered bit positions 24–31, 16–23, 8–15 and 0–7, respectively, of said output lines defining said second format when said multiplexers are enabled; and control means coupled to said plurality of multiplexers for enabling said multiplexers in response to a single instruction executed by said computer system for operating on said data item.

7. The computer system of claim 6 wherein said apparatus is operable to change the format of said data item from said second format to said first format in response to the execution of said single instruction by said computer system.

8. The computer system of claim 6 wherein said first format is big-endian and said second format is little-endian.

9. The computer system of claim 6, wherein said matrix shifter means comprises a barrel shifter.

10. The computer system of claim 6, 7, 8 or 9 wherein said computer system further includes a clocking means for defining execution clock cycles, and wherein the changing of said format of said 32-bit data item from said first format to said second format is completed in response to said single instruction within one of said execution clock cycles of said computer system.

11. In a microprocessor having an internal register set and a barrel shifter, a method of converting a 32-bit data item stored in a first memory format to a second memory format comprising the steps of:

inputting said data item into said barrel shifter along a pair of input buses;

asserting certain control signals connected to said barrel shifter to initiate a conversion;

connecting the ordered bits 0–7, 8–15, 16–23 and 24–31 of said data item along said input buses to corresponding ordered bit positions 24–31, 16–23, 8–15 and 0–7, respectively, of an output data bus, thereby producing a converted data item.

12. The method of claim 11 further including the step of latching said converted data item into a storage location.

13. A method of converting a 32-bit data item from a first format to a second format in a microprocessor device, said method comprising the steps of:

moving said data item from a location in which said data item is stored in said first memory format, to a register; and, in response to the execution of a single instruction by said microprocessor device;

swapping the byte order of said data item such that ordered bits 0–7, 8–15, 16–23 and 24–31 of said data item in said first format correspond to the ordered bit positions 24–31, 16–23, 8–15 and 0–7, respectively, of said register, said swapped data item being in said second format.

14. The method of claim 13 wherein said microprocessor device system further comprises a barrel shifter having a plurality of input bit lines and a plurality of output bit lines, and wherein said swapping step comprises the steps of:

asserting control signals coupled to said barrel shifter to electrically connect the order bit positions 0–7, 8–15, 16–23 and 24–31 of said input bit lines to the corresponding bit positions 24–31, 16–23, 8–15, and 0–7, respectively, of said output bit lines; and reading said data item onto said output bit lines.

15. The method of claim 13 wherein said swapping step is performed within one execution clock cycle of said microprocessor device.

16. The method of claim 15 wherein said first format is little-endian and said second format is big-endian.

17. In a system comprising:

a plurality of computers;

a network, said plurality of computers being coupled to said network for transfer of data therebetween;

a clocking means for defining repetitive execution clock cycles;

a first computer of said system storing a data item in a big-endian memory format and including a means for executing successive instructions and an apparatus for converting said data item to a little-endian memory format in response to a single one of said instructions, said apparatus comprising:

means for transferring said data item stored in said big-endian memory format to a storage element;

means for swapping the byte order of said data item to convert said data item into said little-endian memory format, said swapping means moving the ordered bits 0–7, 8–15, 16–23 and 24–31 of said data item into the ordered bit positions 24–31, 16–23, 8–15 and 0–7, respectively, of said storage element.

18. The system of claim 17 further comprising means for transferring said swapped data item to a second computer of said system across said network.

19. A microprocessor device, comprising:

a unit for receiving and executing instructions;

apparatus responsive to execution of a single one of said instructions for receiving an input data item from a location in said device and swapping the byte order of said input data item to produce an output data item such that ordered bits 0–7, 8–15, 16–23 and 24–31 of said input data item correspond to the ordered bit positions 24–31, 16–23, 8–15, and 0–7, respectively, of said output data item.

20. A device according to claim 19 wherein said input data item is a 32-bit data word.

21. A device according to claim 20 wherein said location is a register.

22. A method of operating a microprocessor device, comprising the steps of:

a) receiving and executing sequential instructions;

b) in response to execution of a single one of said instructions, receiving an input data item from a location in said device and swapping the byte order of said input data item to produce an output data item such that ordered bits 0–7, 8–15, 16–23 and 24–31 of said input data item correspond to the ordered bit positions 24–31, 16–23, 8–15, and 0–7, respectively, of said output data item.

23. A method according to claim 22 wherein said location is a register.

24. Apparatus for swapping the byte order of a 32-bit data item stored in a register of a processor, said apparatus operating in response to a single instruction executed by said processor, said apparatus comprising:

a coupling device having a plurality of input data lines and a corresponding plurality of output data lines, said device being operative to receive said data item from said register on said input data lines and swap the byte order of bits 0–7, 8–15, 16–23 and 24–31 of said data item to corresponding bit positions 24–31, 16–23, 8–15 and 0–7, respectively, on said output data lines; and control logic responsive to said single instruction, said control logic providing signals to said coupling device for controlling said swapping of said byte order of said data item.

25. The apparatus as in claim 24 wherein said coupling device comprises a barrel shifter which includes a plurality of multiplexers, each multiplexer coupling at least one bit of said data item from an input data line to a corresponding output data line.

26. The apparatus as in claim 25, wherein said single instruction comprises two instruction bytes.

27. The apparatus as in claim 24, wherein said swapping of said byte order is performed in one execution clock cycle of said processor.

28. The apparatus as in claim 24, 25, 26, or 27 wherein said apparatus is operable to swap said corresponding bit positions 24–31, 16–23, 8–15 and 0–7, to said byte order of bits 0–7, 8–15, 16–23 and 24–31, respectively, in response to the execution of said single instruction.

29. In a processor operable to execute a set of instructions, a method of converting a 32-bit data item stored in a first memory format to a second memory format in response to the execution of a single instruction of said set comprising the steps of:

inputting said data item into a shifter having input and output data lines;

connecting the ordered bits 0–7, 8–15, 16–23 and 24–31 of said data item along said input lines to corresponding ordered bit positions 24–31, 16–23, 8–15 and 0–7, respectively, of said output data lines.

30. The method as in claim 29, further comprising the step of:

asserting at least one control signal coupled to said shifter to initiate said connecting step.

31. A method of converting a 32-bit data item from a first format to a second format in a microprocessor, said method comprising the steps of:

loading said data item in said first format into a register; and swapping the byte order of said data item in response to the execution of a single instruction by said microprocessor such that ordered bits 0–7, 8–15, 16–23 and 24–31 of said data item in said first format correspond to the ordered bit positions 24–31, 16–23, 8–15 and 0–7, respectively, of said register, said swapped data item being in said second format.

32. The method as in claim 31 further comprising the step of:

loading said swapped data item in said second format into an arithmetic logic unit.

33. The method as in claim 31 wherein said swapping step is performed within one clock cycle of said microprocessor.

34. A computer system comprising:

a network;

a plurality of processors coupled to said network for transfer of data therebetween;

a first processor of said system storing a 32-bit data item in a big-endian memory format, and a unit for converting said data item to a little-endian memory format in response to a single one of said instructions, said unit reversing the byte order of said data item to convert said data item into said little-endian memory format by swapping the ordered bits 0–7, 8–15, 16–23 and 24–31 of said data item into the ordered bit positions 24–31, 16–23, 8–15 and 0–7, respectively.

35. The computer system as in claim 34 further comprising a clocking means for defining repetitive clock cycles for said system.

36. The computer system as in claim 35 wherein said first processor further comprises a register for storing said data item.

37. The computer system as in claim 36 wherein said unit is operable to convert said data item from said big-endian memory format to said little-endian memory format in response to said single instruction.

38. The computer system as in claim 37 further comprising means for transferring said converted data item to a second processor of said system across said network.

39. The computer system as in claim 35, 36, 37, or 38 wherein the conversion of said data item is performed in one clock cycle of said system.

40. A microprocessor comprising:

a register storing a 32-bit data item in a first memory format;

a unit for executing instructions;

a circuit for converting said data item stored in said register to a second memory format in response to a single one of said instructions, said circuit reversing the byte order of said data item to convert said data item into said second memory format by swapping the ordered bits 0–7, 8–15, 16–23 and 24–31 of said data item into the ordered bit positions 24–31, 16–23, 8–15 and 0–7, respectively, of said register.

41. The microprocessor as in claim 40 wherein said first memory format is big-endian and said second memory format is little-endian.

42. The microprocessor as in claim 40 wherein said first memory format is big-endian and said second memory format is little-endian.

43. The microprocessor as in claim 41, wherein said circuit comprises a barrel shifter.

44. The microprocessor as in claim 43 wherein said barrel shifter comprises a plurality of input data lines coupled to receive said data item in said first memory format from said register, and a plurality of output data lines providing said data item in said second memory format to said register.

45. The microprocessor as in claim 43 further comprising an arithmetic logic unit having a latch coupled to said register for latching said data item in said second memory format.

46. The microprocessor as in claim 45, wherein said single instruction comprises two instruction bytes.

47. The microprocessor as in claim 40, 41, 42, 43, 44, 45 or wherein said swapping of said byte order is performed in one execution clock cycle of said processor.

* * * * *